July 31, 1956

E. L. LIND 2,757,144

FLUORIDE PHOSPHORS

Filed Feb. 24, 1954

INVENTOR.
EDWARD L. LIND
BY
J. C. Whittaker large United States Patent Office 2,757,144
Patented July 31, 1956

2,757,144

FLUORIDE PHOSPHORS

Edward L. Lind, Princeton, N. J., assignor to Radio Corporation of America, a corporation of Delaware Application February 24, 1954, Serial No. 412,318

12 Claims. (Cl. 252—301.4)

This invention relates to luminescent materials, also known as phosphors, and particularly to improved luminescent materials of the fluoride type and to improved methods for preparing these materials and luminescent screens including said materials.

It is often desirable to provide a blue-emitting luminescent material exhibiting a long, exponential decay of phophorescence emission upon removal of cathode ray excitation. Heretofore, blue-emitting luminescent materials have either had a short exponential decay or a long power-law decay. The advantage of a material having an exponential decay is that, as the temperature of the material rises and as the excitation intensity increases, the rate of change of phosphorescence with respect to time remains substantially constant. The temperature rise may be due, for example, to continued cathode ray excitation or to increased cathode beam current. In addition a material having an exponential decay provides a more uniform phosphorescence emission during the periods between successive excitations as compared to other known types of decay.

Luminescent materials having a long decay are frequently used in cathode ray tubes for radar purposes, where it is desirable for the emission to remain upon the luminescent screen for a relatively long time.

Luminescent materials, having a somewhat shorter decay than that used for radar purposes, may be used in luminescent screens of kinescopes of television receivers. Where the television receiver is located many miles from the transmitter, in the so-called fringe areas, there is a substantial amount of noise with the signal which appears as random white spots, or snow, upon the luminescent screen of the kinescope. This effect may be minimized to the viewer by using luminescent materials in the screen of the kinescope having a longer decay time. By using long-decay materials, the luminescent image on the kinescope screen dies away more slowly, allowing the image areas of the luminescent screen to build up to a stronger intensity, while allowing the random noise signals to die away in the background areas. A white-emitting kinescope screen often comprises a blue-emitting luminescent material and a luminescent material emitting light of a complementary color. Blue-emitting luminescent materials may also be used in tricolor kinescopes as one of the component colors.

It is an object of this invention to provide improved fluoride-type luminescent materials.

A further object is to provide blue-emitting luminescent materials having a long, exponential decay.

Another object is to provide improved methods and means for preparing fluoride-type luminescent materials.

In general the invention includes luminescent materials comprising manganese-activated calcium beryllium fluorides. The invention also includes manganese-activated calcium beryllium fluorides wherein up to about 25 mole per cent of said calcium has been replaced with another element selected from group II of the periodic table. The invention includes methods of preparing these luminescent materials comprising reacting components yielding fluorine, calcium, beryllium and activator quantities of manganese. Up to 25 mole per cent of the calcium may be replaced with another element selected from group II of the periodic table. According to a first embodiment, the components are permitted to react in an excess of hydrofluoric acid, subsequently drying and, optionally, firing the reacted mixture. According to a second embodiment, the materials may be fired without reaction in hydrofluoric acid.

The foregoing objects and other advantages will be more apparent and the invention will be more completely described by reference to the accompanying drawing in which.

An example of preparing a preferred manganese activated calcium fluoride is as follows: A mixture is prepared of the following ingredients:

| | Grams |
|---|---|
| Calcium carbonate | 10.0 |
| Beryllium oxide | 2.5 |
| Manganese (as manganese fluoride) | 0.033 |

These ingredients are preferably of the highest degree of purity obtainable. This mixture is added to a large excess over stoichiometric proportions of a 50 per cent aqueous hydrofluoric acid solution in a platinum crucible or other acid resistant container. The hydrofluoric acid is present in a large excess in order to minimize the hydrolysis of the materials that are present. The ingredients are permitted to react and the resulting product is dried rapidly at about 125 to 150° C. The dried residue is moistened with aqueous hydrofluoric acid, in order to reconvert any hydrolyzed material back to the unhydrolyzed form, and then redried slowly without boiling. The redried residue is transferred to a carbon crucible, covered to minimize oxidation of the residue and then fired at about 750° C. for about 1 hour. The fired residue is cooled, ground to a desired degree of fineness, replaced in a covered carbon crucible and refired for about 30 minutes at about 700° C. The refired residue is cooled and ready for use as a luminescent material.

Figure 1:
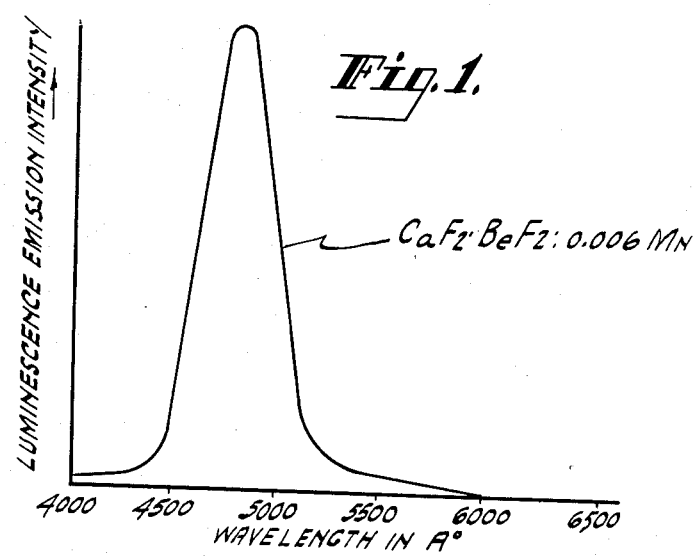
Figure 1 is a spectral distribution curve of the emission of $CaF_2 \cdot BeF_2 \cdot 0.006Mn$ under cathode ray excitation.

The above described luminescent material is a gritty, white to light gray powder having the approximate formula $CaF_2 \cdot BeF_2 : 0.006Mn$. Referring now to Figure 1, the powder is a blue-emitter when excited by cathode rays, having its peak emission intensity at about 4750 A. The ICI coordinates of this material are $\bar{x}=.104$, $\bar{y}=.140$. The crystal structure is tetragonal with the zircon structure.

Figure 2:
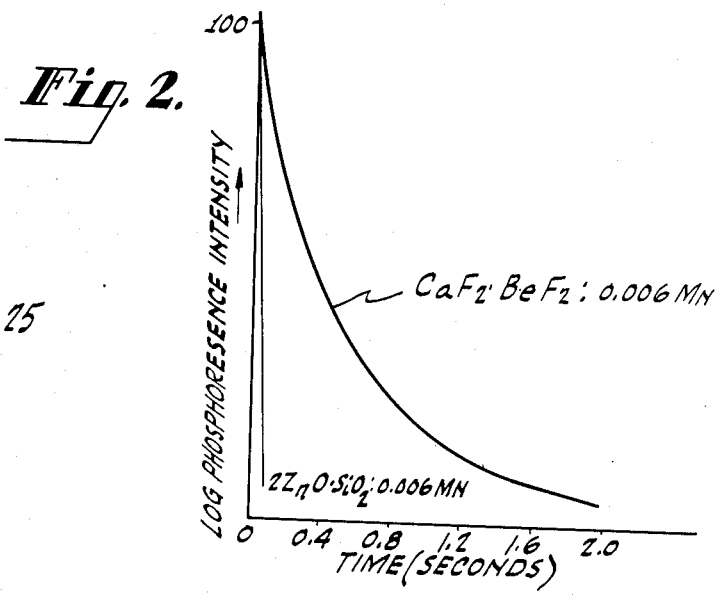
Figure 2 is a set of curves illustrating the phosphorescence decay characteristics of $CaF_2 \cdot BeF_2 : 0.006Mn$ compared to $2ZnO \cdot SiO_2 : 0.006Mn$.

The time constant, that is the time required for the phosphorescence emission to fall to $1/e$ of its maximum value when excitation is removed, is about 70 milliseconds. Referring to Figure 2, the decay, or decrease in phosphorescence emission, is substantially exponential at the outset of the decay followed by a long power law decay.

The compositions of the above-described luminescent materials may be varied as follows: Up to about 25 mole per cent of the calcium present may be replaced with another element selected from group II of the periodic table such as magnesium, zinc, strontium, cadmium, barium, mercury and radium. In some cases a very marked improvement is obtained by such a substitution. For example, when 0.05 mole per cent of the calcium present is replaced with cadmium, the time constant of the luminescent material increases up to 30% and the luminescence efficiency increases up to about 30%.

The mole ratio of beryllium to other elements of group II of the periodic table may be varied from 0.01 to 9. Where the ratio is less than 1, the product is believed to be a mixture of manganese activated calcium fluoride and manganese activated calcium beryllium fluoride. However, the preferred ratio is 1.

The manganese may be present in concentrations between 0.0006 to 0.12 mole of manganese per mole of calcium and other group II elements which may replace it. The preferred concentration is 0.006 mole. As the concentration of manganese increases the color of the fired powder changes from white to almost black.

The elements selected from group II of the periodic table may be introduced in any convenient form. For example, to introduce calcium; calcium oxide, calcium hydroxide, calcium bicarbonate, calcium carbonate or calcium fluoride may be used. Calcium is preferably introduced as the carbonate, however, and beryllium as the oxide.

In the example, when the mixture is completely dissolved in hydrofluoric acid and dried, it is luminescent. However, the luminescent properties may be improved by firing at an elevated temperature. Firing is preferably accomplished in a covered carbon crucible or in a reducing atmosphere, such as hydrogen, hydrogen fluoride or carbon monoxide. The material may also be fired in an inert gas such as nitrogen. The material may be fired for any length of time and the firing should be carried out below the temperature at which there is a liquid phase present. This temperature will depend upon the composition. It is preferred to fire the material of the example for about 1 hour at about 700° C.

The following table gives the observed time constant of materials having the composition $CaF_2 \cdot BeF_2 : 0.006Mn$ fired for 30 minutes at various temperatures.

| Temperature: | Time constant, milliseconds |
| --- | --- |
| Unfired | 57 |
| 400° C | 64 |
| 500° C | 59 |
| 600° C | 64 |
| 700° C | 69 |
| 800° C | 71 |

The step of grinding and refiring the fired luminescent material is optional. It has been found convenient to refire in order to obtain a fine particle size in the final product.

An alternate method of preparing the luminescent materials of this invention is to fire a mixture of finely powdered components at the desired temperature and for the desired period of time. For example, one mole part of powdered calcium fluoride, one mole part of beryllium fluoride and 0.006 mole part of manganese fluoride may be mixed and then fired in a graphite crucible at about 750° C. for about one hour. The foregoing description applies equally to this alternate method of preparation.

The luminescent compositions of the invention have the following general formula: $aCaF_2 \cdot bMF_2 \cdot cBeF_2 : dMn$ wherein $a$ may have values between 0.75 and 1.00, $a+b=1$, $c$ may have values between 0.01 and 9, $d$ may have values between 0.0006 and 0.12 and M is an element selected from the group consisting of magnesium, zinc, strontium, cadmium, barium, mercury and radium. The preferred compositions are $CaF_2 \cdot BeF_2 : 0.006Mn$ and $0.95CaF_2 \cdot 0.05CdF_2 \cdot BeF_2 : 0.006Mn$.

Figure 3:
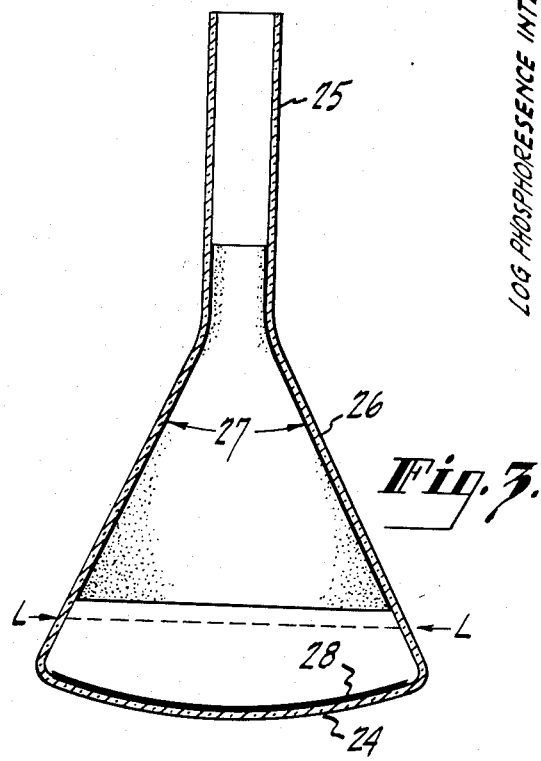
Figure 3 is a sectional view of a cathode ray tube bulb during the preparation of a luminescent screen on the face plate thereof.

Referring to Figure 3, luminescent screens may be prepared using the luminescent materials of the invention. For example, a convenient method of preparing a luminescent screen for a cathode ray tube is to prepare a suspension of the luminescent material in a liquid medium, which medium may be aqueous or non-aqueous such as acetone or methanol. The suspension of the luminescent material is poured through the neck 25 into a cathode ray tube bulb resting on its face plate 24. The suspension fills the bulb up to a convenient level (L—L) of the conical part 26 of the bulb. Screen 28 is formed on face plate 24 by settling from the suspension 29. A conductive coating 27 may be applied to a part of neck 25 and of conical part 26 of the bulb. After the luminescent screen 28 has been settled, baking may be carried out at about 350° C. for about ½ hour with a flow of dried air through the bulb followed by an exhaust bake at about 350° C. for about ½ hour. For example, the face plate 24 may be coated with a tacky material and the dry luminescent powder material dusted on. Or the powdered luminescent material may be mixed with a tacky material and the mixture coated on the face plate.

There have been described improved fluoride-type luminescent materials, and methods and means for preparing them, and for preparing cathode ray tube screens employing such phosphors. These materials exhibit a blue emission upon cathode ray excitation and a long exponential decay upon the removal of the cathode ray excitation. These materials are useful in cathode ray tubes for radar purposes, and as a blue-emitting component in the luminescent screens of kinescopes for use in fringe areas and as the blue-emitting component in tri-color kinescopes.

What is claimed is:

1. A luminescent material comprising a manganese-activated calcium beryllium fluoride wherein 0.0 to about 25.0 mole per cent of said calcium has been replaced with another element selected from group II of the periodic table except beryllium the mole ratio of beryllium to other elements of group II of the periodic table being in the range between 0.01 to 9.0.

2. A luminescent material having the molar composition $aCaF_2 \cdot bMF_2 \cdot cBeF_2 : dMn$ where $a+b=1$, $a$ is 0.75–1.00, $c$ is 0.01–9, $d$ is 0.0006–0.12 and M is an element selected from the group consisting of magnesium, zinc, strontium, cadmium, barium, mercury, and radium.

3. A luminescent material comprising a calcium beryllium fluoride having about 0.0006 to about 0.12 mole of manganese activator per mole of calcium and cadmium, wherein cadmium has replaced calcium in an amount up to 25 mole per cent of the calcium the mole ratio of beryllium to calcium plus cadmium being in the range between 0.01 to 9.0.

4. A luminescent material comprising a calcium beryllium fluoride having about 0.0006 to about 0.12 mole of manganese activator per mole of calcium the mole ratio of beryllium to calcium being about 1.

5. A luminescent material having the molar composition $CaF_2 \cdot BeF_2 : 0.006Mn$.

6. A luminescent material having the molar composition $0.95CaF_2 \cdot 0.05CdF_2 \cdot BeF_2 : 0.006Mn$.

7. A luminescent screen comprising a base and a coating thereon including a luminescent material having the molar composition $aCaF_2 \cdot bMF_2 \cdot cBeF_2 : dMn$ where $a+b=1$, $a$ is 0.75–1.00, $c$ is 0.01–9, $d$ is 0.0006–0.12 and M is an element selected from the group consisting of magnesium, zinc, strontium, cadmium, barium, mercury, and radium.

8. A luminescent screen comprising a base and a coating thereon including a luminescent material having the molar composition $0.95CaF_2 \cdot 0.05CdF_2 \cdot BeF_2 : 0.006Mn$.

9. A method of preparing a luminescent material comprising firing at about 750° C. for about one hour a mixture of ingredients in the following proportions: 1.0 mole of calcium as the fluoride, about 0.01 to 9.0 mole of beryllium as the fluoride and 0.0006 to about .12 mole of manganese activator as the fluoride.

10. A method according to claim 9 wherein up to 25 mole per cent of the calcium has been replaced with cadmium as the fluoride and said manganese is present in proportions of 0.0006 to 0.12 mole per mole of calcium and cadmium.

11. A method according to claim 10 wherein 0.05 mole per cent of calcium has been replaced with cadmium.

12. A method according to claim 10 wherein said mixture is fired in a reducing atmosphere.

References Cited in the file of this patent

J. Electrochem. Soc. vol. 101, No. 4, April 1954, pp. 189–194.